UNITED STATES PATENT OFFICE.

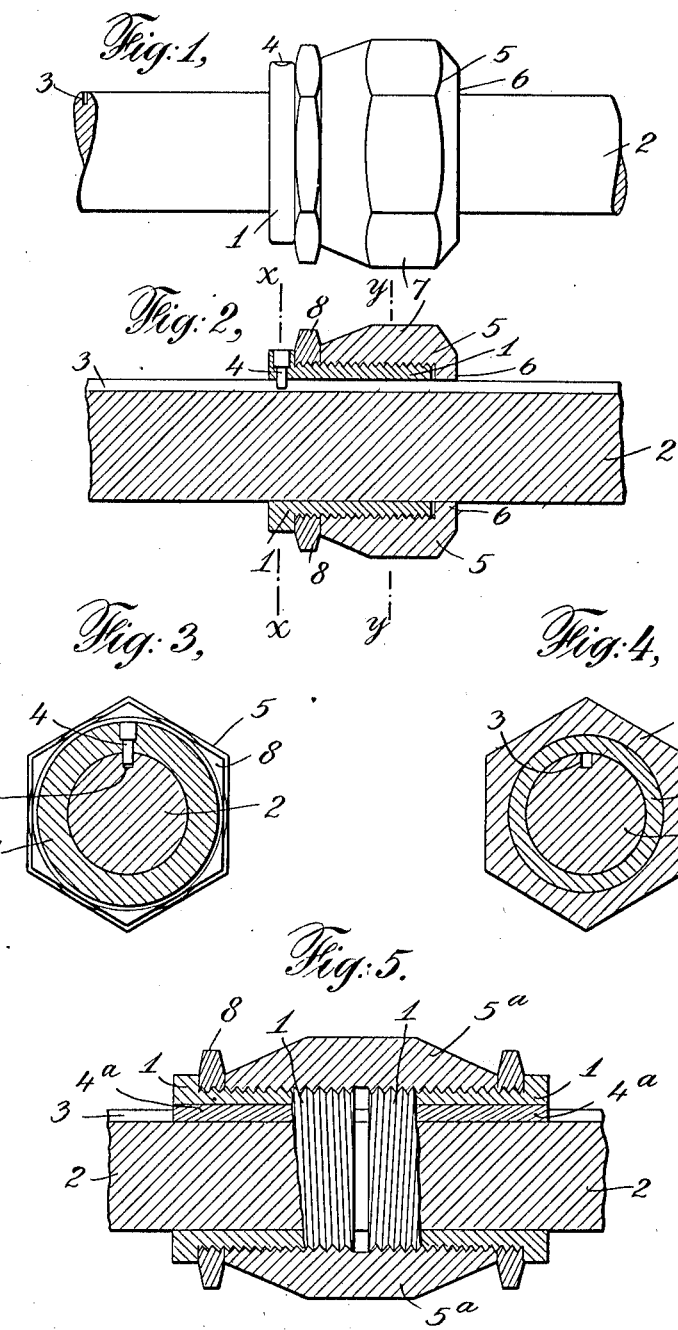

JAMES E. MARBLE, OF PITTSBURGH, PENNSYLVANIA.

ADJUSTABLE SPACING-COLLAR.

1,035,799.  Specification of Letters Patent.  Patented Aug. 13, 1912.

Application filed March 2, 1912. Serial No. 681,188.

*To all whom it may concern:*

Be it known that I, JAMES E. MARBLE, a citizen of the United States of America, and resident of Pittsburgh, in the county of Allegheny and State of Pennsylvania, have invented a new and useful Adjustable Spacing-Collar, of which the following is a specification.

My invention relates to adjustable spacing collars.

The improved collar herein described is particularly intended for use in spacing apart the cutters of milling machines, but is adapted to be used on or in connection with other machines wherein two or more parts or members require to be spaced apart. I will describe my invention, however, as used in connection with milling machines, it being understood that in so doing I do not limit myself to such use alone.

In locating cutters on the spindles or arbors of milling machines, it is at present the custom to use loose collars or washers of different lengths or to use a plurality of collars or washers. This applies, whether only a single cutter is to be located on the spindle or arbor, or whether a plurality of cutters, spaced apart according to the requirements of the particular work to be done, are to be located on such arbor. It is therefore necessary to keep at hand a large number of collars or washers of different lengths, and even then such collars do not lend themselves readily to accurate adjustment of cutters to within, say, a small fraction of an inch. To accurately locate the cutters for a particular job, it is often necessary to make special collars of the particular length required. The use of such collars of fixed length furthermore makes it difficult to adjust the position of the cutters to the work or to each other after the cutters, spacing collars, etc., have been set up on the spindle or arbor; and when, as is commonly the case on large milling machines, an outer bearing is provided for the spindle or arbor, change of position or spacing of the cutters, even such changes as are incident to final adjustment of position of the cutters with respect to the particular work to be done, often involves the removal of the support for the outer bearing and the removal of several cutters, spacing collars, etc. For the reasons stated, the mere setting up of the cutters of a milling machine, for a particular job, often takes a great deal of time.

The spacing collar forming the subject-matter of my invention is adjustable as to length, through a wide range, after such collar is in place on the spindle and after the cutters have been mounted on that spindle, and is adjustable to very small fractions of an inch, and may be adjusted by means of the ordinary wrenches with which milling machines and like machine tools are customarily provided.

In setting up a gang of cutters on a milling machine, when using my improved spacing collars, it is necessary merely to place the cutters and collars on the spindle or arbor in proper order, and then, after this has been done, to adjust the spacing collars as to length to bring the cutters into exactly the desired position; and each collar may be adjusted in this manner by a few turns of a wrench. Similarly, when my collars are used, it is an easy matter to make new adjustments of the positions of the cutters, as may be required when changing from one job to another, without removing any of the cutters or spacing collars unless the character of the new work positively requires such removal.

The object of my invention is to facilitate and make possible the quick and accurate adjustment of machine parts, particularly the cutters of milling machines and the like.

I will now proceed to describe my invention with reference to the accompanying drawings, in which one construction of adjustable spacing collar embodying my invention is illustrated, and will then point out the novel features in claims.

In the said drawings: Figure 1 shows a side elevation of my improved spacing collar, mounted on the spindle or arbor of a milling machine or like tool. Fig. 2 shows a longitudinal section of the same parts. Fig. 3 shows a transverse section on the line $x$—$x$ of Fig. 2, and Fig. 4 a transverse section on the line $y$—$y$ of Fig. 2. Fig. 5 shows a longitudinal section of an alternative type of collar.

In the drawings, 1 designates a bushing, adapted to be mounted on the spindle 2 of a milling machine or like tool, said bushing being screw-threaded exteriorly, and being provided with a key 4 adapted to engage the key-way 3 with which such spindles are commonly provided; whereby rotation of the bushing 1 on spindle 2 is prevented.

5 designates a hollow nut, screwing over bushing 1, and preferably provided with an end-portion 6 having a bearing on spindle 2. This nut 5 is not keyed to the spindle 2, as is the bushing 1, but is free to rotate with respect to said spindle, and is provided with means, such for example as the flat faces 7, whereby said nut may be engaged by a wrench or other suitable tool for the purpose of screwing it back or forward with respect to bushing 1. It is obviously important to provide means for clamping the nut 5 against rotation with respect to bushing 1, once a correct adjustment has been reached, and for this purpose I provide a lock-nut 8 on bushing 1, which, once the nut 5 has been adjusted to give to the combined device 1—5 the desired overall length, may be screwed up against said nut 5, so locking said nut 5 against rotation with respect to bushing 1 in the well-known manner.

In the alternative construction, illustrated in Fig. 5, the nut, here designated by numeral 5ª, is provided with two bushings 1, screwing into opposite ends of said nut, each such bushing being provided with a lock-nut 8. In this construction also, instead of securing the bushings against rotation with respect to the spindle 2 by a pin-key 4, as in the construction shown in Figs. 1 and 2, sliding keys 4ª, fitting within keyways formed in bushings 1 as well as in the keyway 3 of the spindle 2, as provided. This construction shown in Fig. 5 is particularly adapted for use when particularly great adjustments of overall length are desired. The two ends of nut 5ª are, of course, threaded oppositely, as are the bushings 1.

It will be obvious that when using my improved spacing collars, it is the work of but an instant for the workman to adjust, by means of these collars, the positions of the cutters as desired, or to change the adjustment when desired.

What I claim is:—

1. A spacing device, such as described, comprising in combination two hollow screw-connected members adapted to fit upon a tool-spindle or like machine part, one of said members provided with means whereby it may be secured against rotation with respect to such spindle, the other member provided with means whereby it may be rotated with respect to said first member, and locking means for preventing relative rotation of said members when desired.

2. A spacing device, such as described, comprising in combination two hollow screw-connected members adapted to fit upon a tool-spindle or like machine part, one of said members provided with means whereby it may be secured against rotation with respect to such spindle, the other member provided with means whereby it may be rotated with respect to said first member, and a lock nut on the threaded portion of one of said members, such lock nut adapted to be screwed against the other of said members and thereby prevent relative rotation of said members.

3. A spacing device, such as described, comprising in combination an exteriorly threaded bushing adapted to fit upon a tool-spindle or like machine part and an interiorly threaded nut adapted to screw upon such bushing and likewise to fit upon a tool-spindle or the like, one of said members provided with means whereby it may be secured against rotation with respect to such spindle, the other of said members provided with means whereby it may be rotated with respect to said first member, and locking means for preventing relative rotation of said members when desired.

4. A spacing device, such as described, comprising in combination an exteriorly threaded bushing adapted to fit upon a tool spindle or like machine part and provided with means for key-connecting it to such spindle, an interiorly threaded nut adapted to screw upon such bushing, and a lock nut on said bushing adapted to be screwed against said first-mentioned nut and thereby lock such first mentioned nut and the bushing together against relative rotation.

5. A spacing device, such as described, comprising in combination an exteriorly threaded bushing adapted to fit upon a tool spindle or like machine part and provided with means for key-connecting it to such spindle, an interiorly threaded nut adapted to screw upon such bushing, and provided at one end with means adapted to have a bearing on such spindle, and a lock nut on said bushing.

In witness whereof I have signed this specification in the presence of two subscribing witnesses.

JAMES E. MARBLE.

Witnesses:
ROBT. WRAY,
E. A. FORD BARNES.

---

Copies of this patent may be obtained for five cents each, by addressing the "Commissioner of Patents, Washington, D. C."